United States Patent [19]

Deiana

[11] Patent Number: 4,691,661
[45] Date of Patent: Sep. 8, 1987

[54] SELF-ADJUSTING BREAKWATER FOR ARTIFICIAL HARBORS

[76] Inventor: Salvatore Deiana, #307-450 North Nanaimo Street, Vancouver, British Columbia, V5L 3G8, Canada

[21] Appl. No.: 654,900

[22] Filed: Sep. 27, 1984

Related U.S. Application Data

[63] Continuation-in-part of Ser. No. 378,174, May 14, 1982, Pat. No. 4,487,151.

[30] Foreign Application Priority Data

May 15, 1981 [CA] Canada ................................. 377683

[51] Int. Cl.$^4$ ................................................. E02B 3/06
[52] U.S. Cl. ................................... 114/267; 114/266; 405/26; 405/63; 405/68
[58] Field of Search ................. 114/266, 267; 441/21, 441/28, 30; 405/63, 68, 26

[56] References Cited

U.S. PATENT DOCUMENTS

| | | | |
|---|---|---|---|
| 3,230,967 | 1/1966 | Castro | 405/68 |
| 3,592,006 | 7/1971 | Crucet | 114/267 |
| 3,613,377 | 10/1971 | Zaugg | 405/68 |
| 3,628,334 | 12/1971 | Coleman | 405/26 |
| 3,779,020 | 12/1973 | Muramatsu | 405/68 |
| 3,848,419 | 11/1974 | Bowley | 405/26 |
| 4,015,431 | 4/1977 | Ahiko | 114/267 |
| 4,027,486 | 6/1977 | Dougherty | 114/267 |
| 4,048,802 | 9/1977 | Bowley | 405/26 |
| 4,174,186 | 11/1979 | Kiasat | 114/267 |
| 4,188,155 | 2/1980 | Langermann | 405/63 |
| 4,244,819 | 1/1981 | Ballu | 405/68 |
| 4,487,151 | 12/1984 | Deiana | 114/261 |

Primary Examiner—Joseph F. Peters, Jr.
Assistant Examiner—C. T. Bartz
Attorney, Agent, or Firm—Antonelli, Terry & Wands

[57] ABSTRACT

An artificial breakwater which dynamically changes shape and thus absorbs both surface and undersurface wave energy with varying wave height. The breakwater elements are flexible and extensible walled bags of which a major part is to be submerged below the surface of the sea. At least one anchor is fixed by a cable to the bottom of the bag. The bag is filled mostly with water and partly by air, whereby at least part of the air filled portion extends above the surface of the sea. The flexibility and extensibility of the bag is such that in the presence of waves its vertical dimension increases or reduces, thereby impeding transmission of wave energy at and below the surface.

6 Claims, 6 Drawing Figures

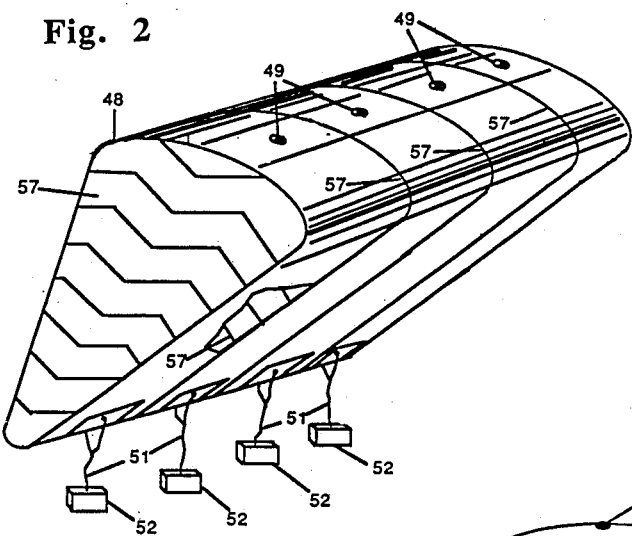
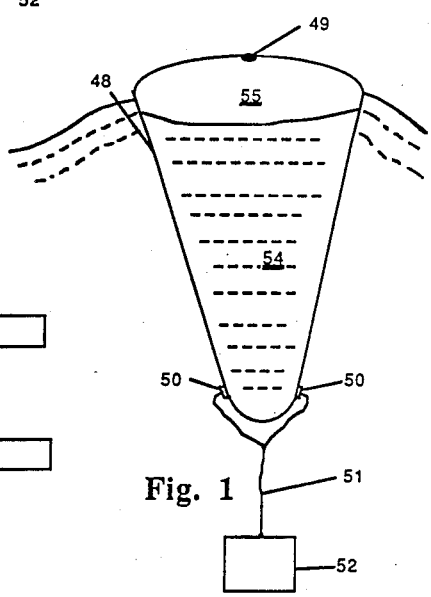
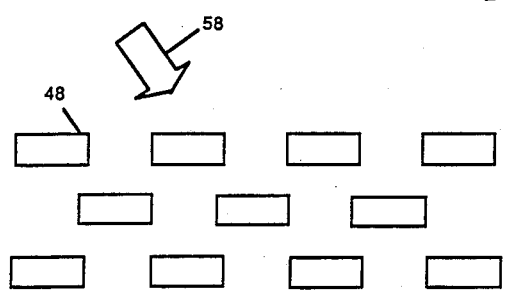
Fig. 2
Fig. 1
Fig. 4

SELF-ADJUSTING BREAKWATER FOR ARTIFICIAL HARBORS

This is a continuation-in-part of U.S. patent application Ser. No. 378,174 filed May 14th, 1982, now U.S. Pat. No. 4,487,151, issued Dec. 11, 1984.

This invention relates to an artificial breakwater which dynamically changes shape and thus absorbs both surface and undersurface wave energy with varying wave height.

Artificial breakwaters generally fall into two classes, one in which a permanent wall is built from the bottom of the ocean above the surface, and another which utilizes floating members which are anchored by means of cables to the ocean floor. The present invention is directed to a novel form of floating breakwater.

In, for example, U.S. Pat. No. 4,048,802 rigid floating are anchored to the sea floor, with the members being inverted vessels which are mostly filled with air, from which hang disks, and which are surrounded by annuluses. The structure is designed to float near the top of the sea, and pitch when hit by the waves in order to absorb wave energy. Flexible lines retain sequences of the structures in place. The patent states that it is effective to reduce the kinetic energy of the wave adjacent the surface.

However in the case of very heavy seas, for example the case in which the wave height is approximately the same height as that of the barrier, a significant amount of wave energy passes beneath the barrier. Consequently, the patented form of wave barrier is not satisfactory in many sea conditions.

The present invention is an artificial breakwater in which the breakwater elements themselves dynamically change their vertical dimension in order to dynamically vary with wave height.

They thus self-adjust according to sea conditions to efficiently absorb wave energy both adjacent and below the surface of the sea. Furthermore, while the mass of the breakwater elements in the aforenoted U.S. patent forms the major part of the energy absorbing structure, in the present invention water maintained within the breakwater elements absorbs the major part of the energy absorbing medium.

The breakwater elements are flexible and extensible walled bags of which a major part is to be submerged below the surface of the sea. At least one anchor is fixed by a cable to the bottom of the bag. The bag is filled mostly with water and partly by air, whereby at least part of the air filled portion extends above the surface of the sea. The flexibility and extensibility of the bag is such that in the presence of waves its vertical dimension increases or reduces, thereby impeding transmission of wave energy at and below the surface.

Preferably, the bag is divided into a plurality of compartments isolated from each by impermeable flexible walls. Preferably the flexible walls are bellow shaped. When deployed, using a plurality of anchors fixed by separate cables to the bottom of the bag, the bag in cross section takes the form of a wedge.

To form the breakwater, a plurality of such independent bags is deployed in staggered rows, in which the bags of successive rows are located opposite the gaps between the bags of preceding rows.

The dynamic vertical elongation and shortening as the bag encounters a wave and trough between the waves respectively has been determined to be an effective wave barrier for kinetic energy both near the surface and well below the surface of the sea.

A better understanding of the invention will be obtained by reference to the detailed description below, in conjunction with the following drawings, in which:

FIG. 1 is a cross section of a bag element used in the artificial breakwater,

FIG. 2 is a perspective view of a preferred form of bag element used in the artificial breakwater, FIG. 4 shows a preferred deployment layout of the bag elements to form the artificial breakwater.

Figure 3A:
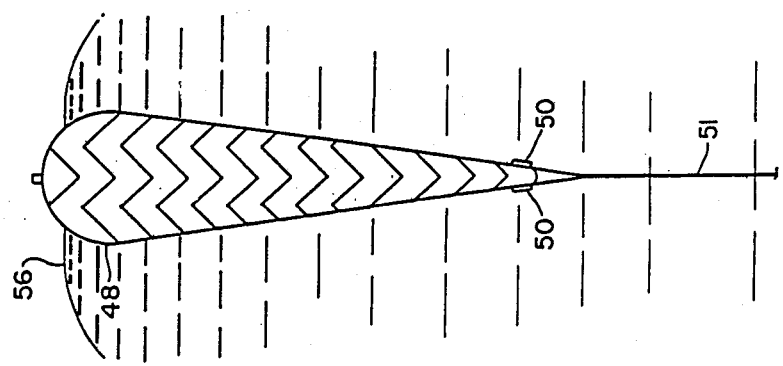
FIGS. 3A, 3B and 3C are end views of the artificial breakwater bag elements shown in various kinds of sea conditions.

As shown in FIG. 1 the basic bag element is comprised of an elongated container or bag 48 formed of a reinforced inflatable material such as rubber, or more preferably rubber with a fiber strengthener. A valve 49 extends from the top surface to the interior of the bag.

Referring now also to FIG. 2, reinforced pads 50 are located at spaced intervals along or adjacent the bottom of the bag. Rubber coated steel cables, or preferably NYLON TM cables 51 are fixed to the bag centrally of each pad, with anchors 52, preferably of concrete material, attached to the cables 51 along the bottom of the bag.

When first introduced in place in the water, the bag is partly inflated by means of air introduced through valve 49. Then the concrete anchors are attached as shown. The curtain thus assumes a vertical working position. Water is then allowed to enter container 48 through a side entrance valve (not shown), or through valve 49. Pressurized air and water are then alternately introduced into the bag, in a way such that the bag maintains a comfortable working height in the water. This is continued until the water is contained within region 54, and pressurized air is contained in region 55. The interface level preferably is at normal water or sea level.

When the structure is formed and filled as described, it takes the form shown in FIG. 2, having a V or wedge shaped bottom and oval shaped top.

The structure described above provides significant breakwater utility, using the weight of contained sea water as well as an increased barrier height provided by the pressurized air region to absorb wave energy as will be described below.

It is preferred that each breakwater bag should be divided into unitary compartments (e.g. preferably four compartments), which are defined by impermeable dividers and end walls 57 (see FIG. 2). Thus, each compartment can be filled independently, and in case of damage to one compartment, the remaining compartments will still retain the breakwater afloat.

It is preferred that the dividers 57 as well as the end walls should be folded or shaped like bellows. This allows vertical and/or horizontal expansion of the bag, for the purposes to be described below.

In FIG. 3A the sea is calm, and the top of the breakwater floats above the surface due to the air bubble contained therein, with its bottom portion hanging below due to the force of the anchor.

Figure 3B:
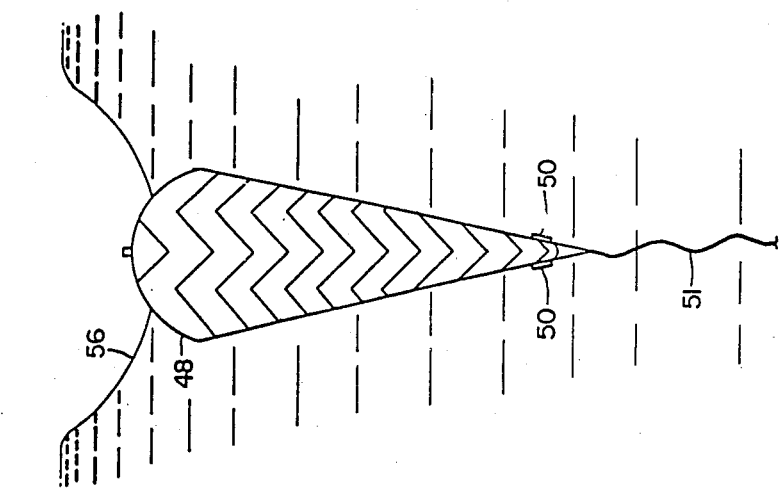

In FIG. 3B, the bag, which is not completely filled, is carried between waves, and therefore drops to a lower level than in a calm sea. The top of the breakwater bag remains above water dur to the contained air bubble. The cable 51 becomes slack. The width of the bag expands, and its vertical dimension decreases. The water within the bag absorbs kinetic energy imparted by the wave.

Figure 3C:
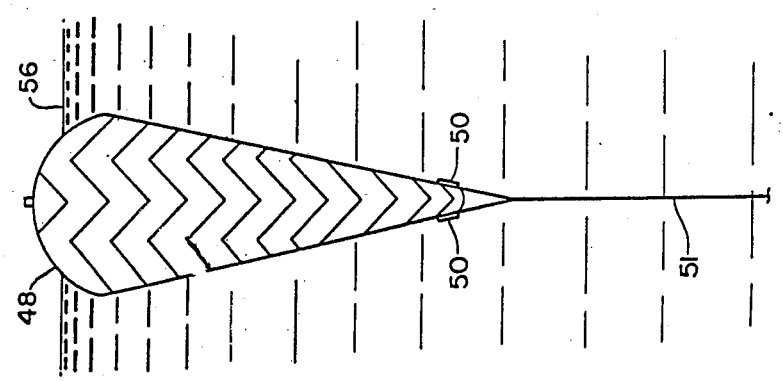

In FIG. 3C the bag is carried upward by a wave. The air bubble maintains the top of the bag above the water which would otherwise be prohibited due to the cable length, and it elongates and becomes narrower. The folded shape of the compartment dividers and end portions allow the bag to elongate vertically. Due to the vertical elongation, kinetic energy of the wave far below the wave surface is absorbed by the water contained within the bag, thus increasing its effectiveness as a breakwater element as compared to fixed height floating breakwater elements.

It is preferred that the air and water introduced into the compartments should only be made to about 75% capacity, in order to facilitate the above-described vertical elongation.

As shown in FIG. 4, a plurality of rows of independent bags 48 are located with the elements of one row staggered from the elements of the preceding row. Thus, the bags of successive rows are located opposite the gaps between the bags of preceding rows.

As the sea wave front (depicted by arrow 58) impinges on the independent bags, their tops float at the surface, and they elongate as each wave passes, and shorten in the troughs between the waves. Each bag thus individually dynamically adjusts its own position relative to the wave front, dynamically varying its shape, dimensions and position to be most effective to absorb the kinetic energy of the wave. Because each bag is not rigidly locked to the next, the elongation or compression of one bag will not effect the position or shape of the adjacent bags.

The present invention thus provides an effective means to create artificial harbors and to protect the coastline or marine structures from the motion of the sea.

A person skilled in the art understanding this invention may now conceive of various other embodiments using the principles described herein. All are considered to be within the scope of the invention as defined in the claims appended hereto.

I claim:

1. For use in a artificial breakwater an extensible and flexible walled sealed bag of which a major part is to be submerged below the surface of the sea, at least one anchor fixed by a cable to the bottom of the bag, the bag being filled mostly with water and partly by air, whereby at least a part of the air filled portion extends above the surface of the sea, the extensibility of the bag being such that in the presence of waves or troughs between waves its vertical dimension dynamically can increase or reduce thereby impeding transmission of wave energy at and below the surface therethrough, the bag being divided into a plurality of sealed compartments isolated from each other by impermeable extensible and flexible walls, and a plurality of anchors are fixed by separate cables to the bottom of the bag, whereby the bag, when deployed, takes the form of a wedge in cross section.

2. A bag as defined in claim 1, in which the extensible walls are shaped as bellows.

3. A bag as defined in claim 2, including a valve extending between the outside and the top portion of each compartment for controllably passing air into the upper portion of each compartment.

4. An artificial breakwater comprising a plurality of independent bags as defined in claim 1 or 3 deployed in staggered rows.

5. An artificial sea wave breakwater comprising a plurality of rows of floating flexible sealed walled bags, the bags of successive rows being located opposite the gaps between the bags of preceding rows, each bag being formed of water-tight compartments separated by flexible bellows shaped walls, a valve extending into the top of each compartment for introducing air therein, each compartment being filled partly with air and mostly with water, anchors fixed by cables along and to the bottom of each bag, whereby each bag partly floats in a vertically elongated shape above the associated anchors, the flexibility of the bags and the walls being such that the vertical elongation of the bags changes with wave motion, elongating vertically in the presence of a wave and shortening vertically in the presence of a trough between waves, thus dynamically varying its vertical size with wave height, the plurality of bags thereby absorbing wave energy both at and below the surface of the sea.

6. A breakwater as defined in claim 5 in which the anchors are comprised of weights.

* * * * *